United States Patent
Spaggiari

(10) Patent No.: US 7,768,167 B2
(45) Date of Patent: Aug. 3, 2010

(54) METHOD FOR ASSEMBLING AN ELECTRIC MOTOR AND MOTOR OBTAINED USING THIS METHOD

(75) Inventor: Alessandro Spaggiari, Correggio (IT)

(73) Assignee: Spal Automotive s.r.l., Correggio (Reggio-Emilia) (IT)

(*) Notice: Subject to any disclaimer, the term of this patent is extended or adjusted under 35 U.S.C. 154(b) by 0 days.

(21) Appl. No.: 12/226,684

(22) PCT Filed: May 8, 2007

(86) PCT No.: PCT/IB2007/001184

§ 371 (c)(1),
(2), (4) Date: Oct. 24, 2008

(87) PCT Pub. No.: WO2007/129205

PCT Pub. Date: Nov. 15, 2007

(65) Prior Publication Data

US 2009/0121569 A1    May 14, 2009

(30) Foreign Application Priority Data

May 8, 2006  (IT) .......................... BO2006A0339

(51) Int. Cl.
  *H02K 5/00*   (2006.01)
(52) U.S. Cl. .......................... 310/90; 310/89
(58) Field of Classification Search .................. 310/90, 310/89, 71, 239
See application file for complete search history.

(56) References Cited

U.S. PATENT DOCUMENTS

| 4,847,528 | A  |   | 7/1989 | Eguchi et al. |
| 5,184,039 | A  | * | 2/1993 | Kraft .......................... 310/89 |
| 5,767,596 | A  |   | 6/1998 | Stark et al. |
| 5,895,207 | A  |   | 4/1999 | Burgdorf et al. |
| 5,959,383 | A  | * | 9/1999 | Winzen et al. ............. 310/90.5 |
| 6,011,339 | A  | * | 1/2000 | Kawakami .................. 310/208 |
| 6,150,744 | A  |   | 11/2000 | Onishi |
| 6,204,577 | B1 | * | 3/2001 | Chottiner et al. ............ 310/424 |
| 6,257,592 | B1 |   | 7/2001 | Hashizawa et al. |
| 2003/0098548 | A1 |   | 5/2003 | Boone et al. |

FOREIGN PATENT DOCUMENTS

| DE | 33 44419 A1 | 6/1985 |
| DE | 42 35 437 C1 | 9/1993 |
| EP | 0 500 282 A1 | 8/1992 |
| EP | 1 045 174 A2 | 10/2000 |
| EP | 1 191 262 A1 | 3/2002 |
| JP | 57054832 | 4/1982 |
| WO | 2005/034309 A1 | 4/2005 |

\* cited by examiner

*Primary Examiner*—Dang D Le
(74) *Attorney, Agent, or Firm*—The Nath Law Group; Jerald L. Meyer; Brooks Gifford, III

(57) ABSTRACT

A method for assembling an electric motor of the type comprising a stator unit (5) and a rotary unit (6) housed in a containment compartment (2a) delimited by a casing (2), comprises the step of exposing the compartment (2a) to a different pressure relative to the outside environment and the step of checking for the passage of fluid between the outside environment and the compartment (2a) in order to test the motor (1) hermetic seal.

3 Claims, 9 Drawing Sheets

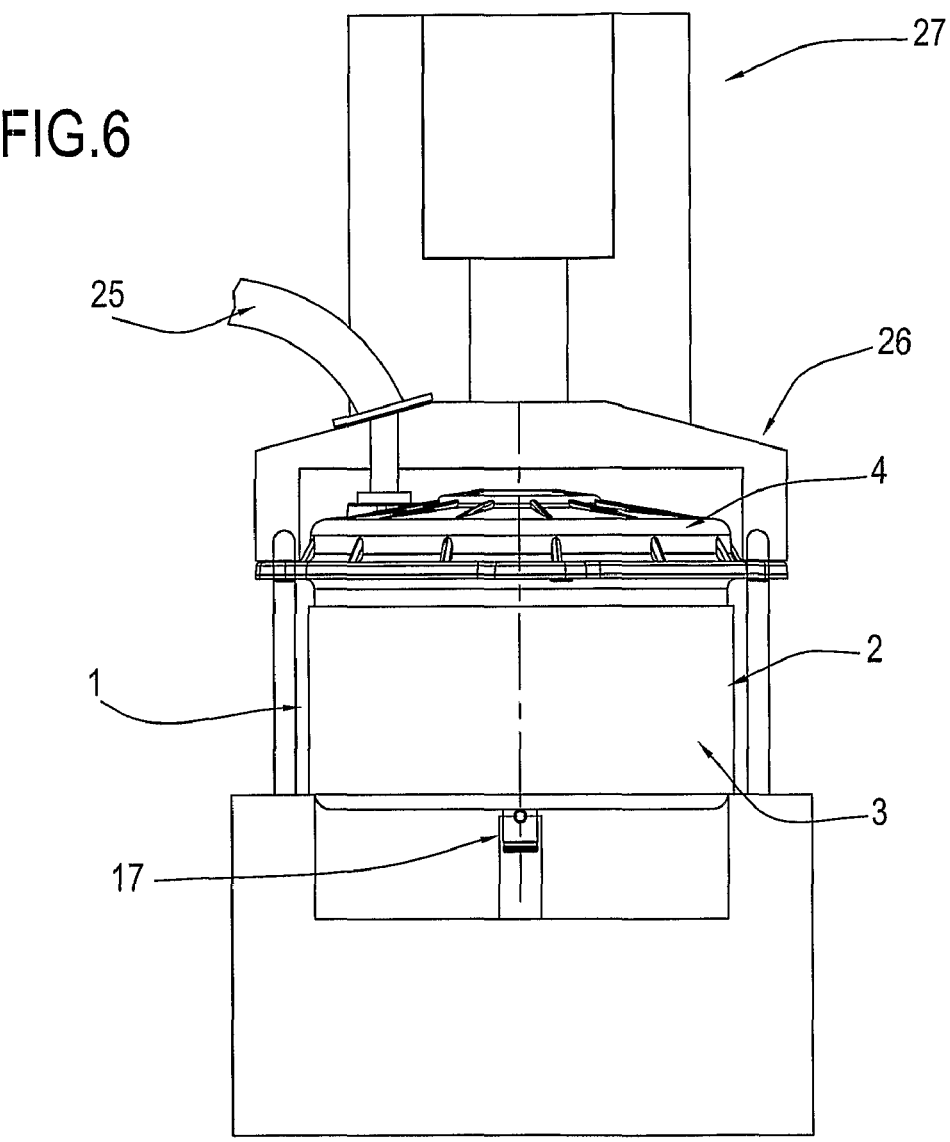
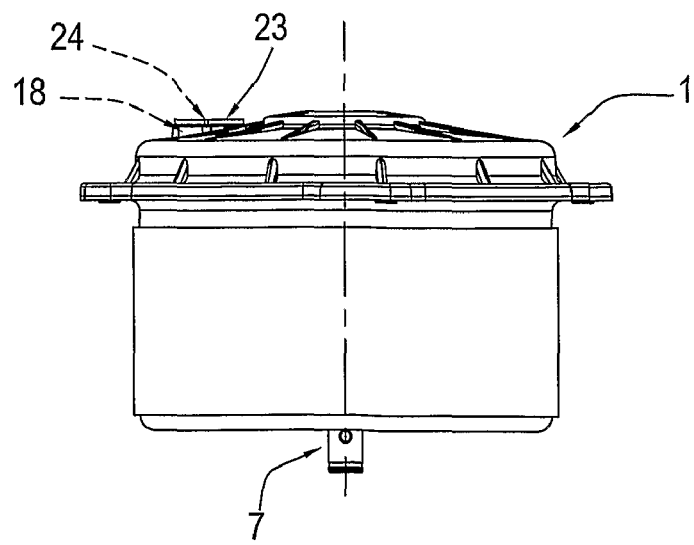

METHOD FOR ASSEMBLING AN ELECTRIC MOTOR AND MOTOR OBTAINED USING THIS METHOD

TECHNICAL FIELD

The present invention relates to a method for assembling an electric motor and in particular a watertight electric motor.

Specific reference is made below to an electric motor, although it shall be understood that the invention may relate to any rotary electric machine, such as an alternator or a dynamo.

BACKGROUND ART

In general, a rotary electric machine comprises a stator, a rotor mounted on a shaft and a casing with supports for the rotor shaft.

To mount the stator and the rotor in the casing, the latter must be divided into at least two parts which can be assembled.

An example of an electric machine and a method for making it is known from patent U.S. Pat. No. 5,767,596.

Also known, especially in the sector of electric fans for motor vehicles, are watertight and moisture proof electric motors.

Such motors are designed to operate in environmental situations and in positions in which they may be subject to infiltration by water and moisture, which may create electrical problems for the motor.

There have been prior art attempts to make a watertight casing for electric motors, in particular made by inserting a gasket between the two parts mentioned above, for example as described in document WO2005/034309 by the Applicant.

However, this type of assembly is not without disadvantages: in particular, when the motor is closed, that is to say when the lid and the cup-shaped part are locked relative to one another, there is no absolute guarantee that the motor will be hermetically sealed.

Despite the many efforts made to ensure this, the gasket between the two parts of the casing may not be perfectly positioned or effectively squashed to guarantee a suitable seal between the parts in contact.

Moreover, infiltrations may occur at the motor shaft supports, in particular where the motor shaft comes out of the casing for motor effectiveness.

DISCLOSURE OF THE INVENTION

In this context, the main technical purpose of the present invention is to propose a method for assembling an electric motor and an electric motor obtained with this method which are free of the above-mentioned disadvantages.

One aim of the present invention is to propose a method which allows an electric motor to be obtained with good hermetic properties.

Another aim of the present invention is to propose a method for assembling an electric motor which is simple and inexpensive to implement.

The stated technical purpose and aims of the invention are substantially achieved by, a method for assembling an electric motor as described in claim 1 and in one or more of the dependent claims herein.

BRIEF DESCRIPTION OF THE DRAWINGS

Further features and advantages of the present invention are more apparent in the description below, with reference to a preferred, non-limiting embodiment of a method for assembling an electric motor and a motor obtained using this method, as illustrated in the accompanying drawings, in which:

FIG. 6 is a schematic side view of an assembly step in accordance with the present invention;

FIG. 7 is a schematic side view of another assembly step in accordance with the present invention;

DETAILED DESCRIPTION OF THE PREFERRED EMBODIMENTS OF THE INVENTION

Figure 4:
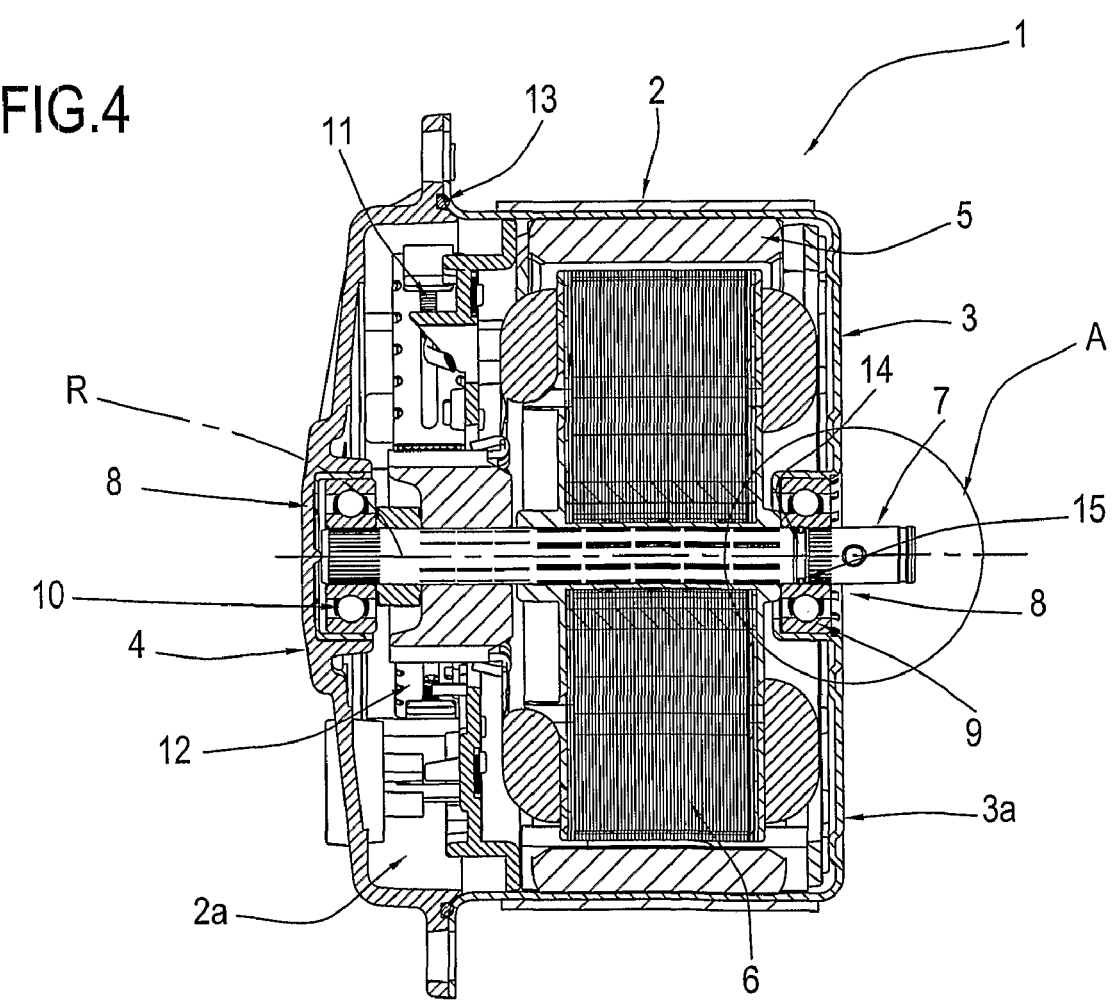
FIG. 4 is a schematic view of the cross-section IV-IV from FIG. 2.
Figure 8:
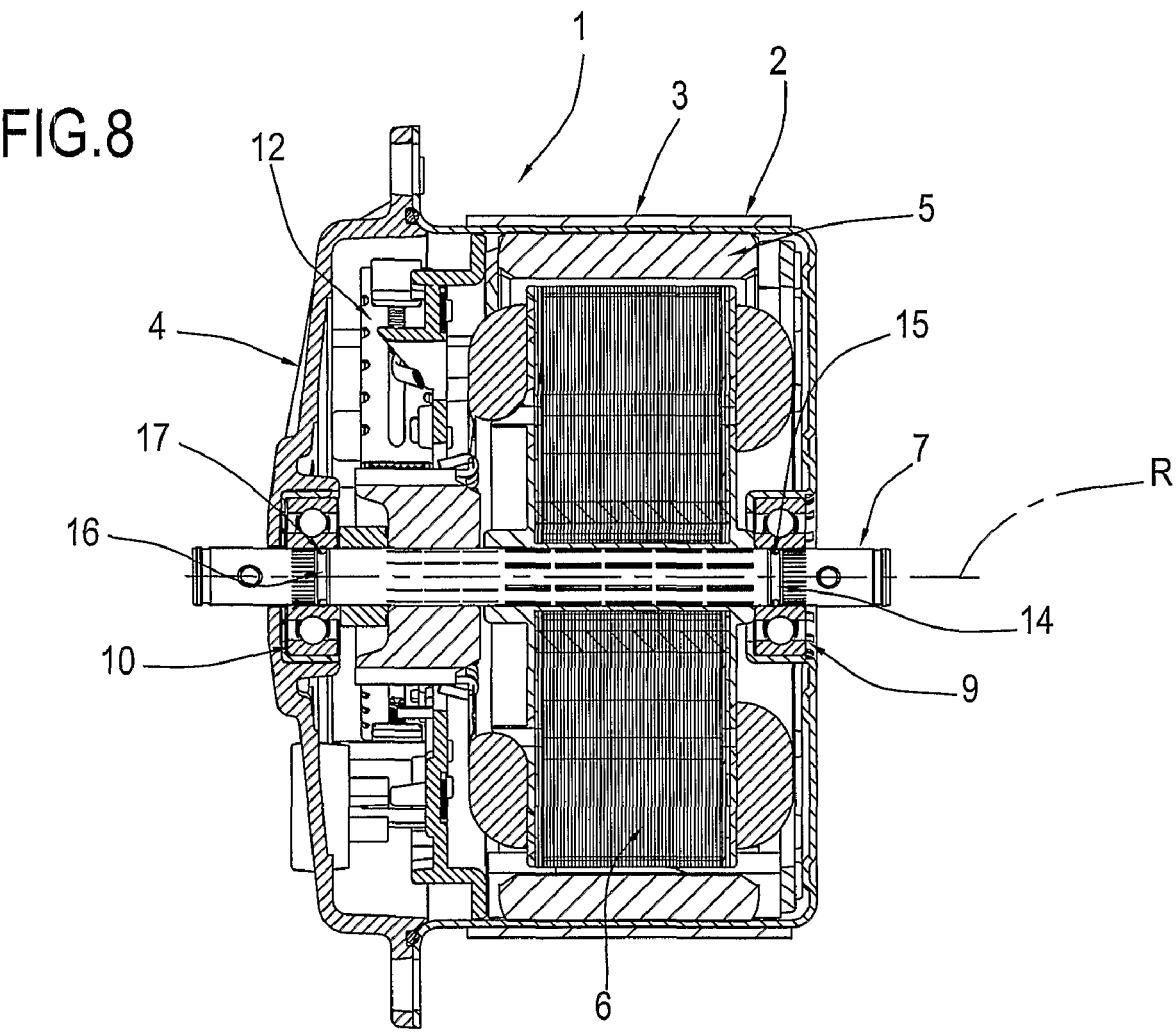
FIG. 8 is a schematic cross-section of a second embodiment of a motor in accordance with the present invention.

With reference to the accompanying drawings and in particular with reference to FIGS. 4 and 8, the numeral 1 denotes an electric motor assembled in accordance with the present invention.

The description below refers specifically to an electric motor, but it shall be understood that the invention may also relate to other types of rotary electric machines, for example power generators, alternators and the like.

The electric motor 1 comprises, schematically, an outer casing 2 delimiting a containment compartment 2a.

The casing 2 consists of a substantially cup-shaped part or container 3 and a lid 4 connected to one another with connecting devices of the known type and therefore not illustrated in detail.

An electromagnetic unit consisting of a stator unit 5 and a rotary unit 6, of the substantially known type, is housed in the casing 2.

The rotary unit 6, able to rotate about an axis R, comprises a shaft 7 partly projecting outside the casing 2.

As illustrated in FIG. 8, the motor 1 shown is of the so-called "twin-shaft" type, that is to say, the shaft 7 and the casing 2 are made in such a way that the shaft 7 axially comes out of the cup-shaped part 3 and the lid 4.

The motor 1 comprises means 8 for supporting the rotary unit 6 positioned inside the casing 2.

In particular, the rotary unit 6 is rotatably constrained to the cup-shaped part 3 and to the lid 4 by bearings 9 and 10, respectively.

The bearings 9, 10 are locked to the lid 4 and to the container 3 and the shaft 7 is inserted in them.

The bearing 9 is of the sealed type to prevent infiltrations from outside through the bearing 9.

In the case of a twin-shaft motor 1 the bearing 10 is also preferably sealed.

It should be noticed that the bearing 9 is inserted in a relative cavity 9a made in the base wall 3a of the cup-shaped part 3, whilst the lid 4 has a cavity 10a for the bearing 10.

The bearing 9 is locked in the cavity 9a preferably by means of caulking, as described in further detail below.

Moreover, in the preferred embodiment illustrated the motor 1 comprises an O-ring 20 positioned between the bearing 9 and the base wall 3a.

The motor 1 also preferably comprises a gasket 21, substantially tubular, positioned between the bearing 10 and the lid 4.

The gasket 21 has an inner lip 21a positioned between the bearing 10 and the lid 4.

In practice, the gasket 21 is inserted in the cavity 10a and the bearing 10 is in turn inserted in the gasket 21, pressing the inner lip 21a against the lid 4.

FIG. 4 in particular shows how the motor 1 comprises means 11 for supplying power to the motor 1, said means housed in the casing 2.

In the embodiment illustrated, the power supply means 11 consist of a brush holder 12 of the substantially known type.

Figure 1:
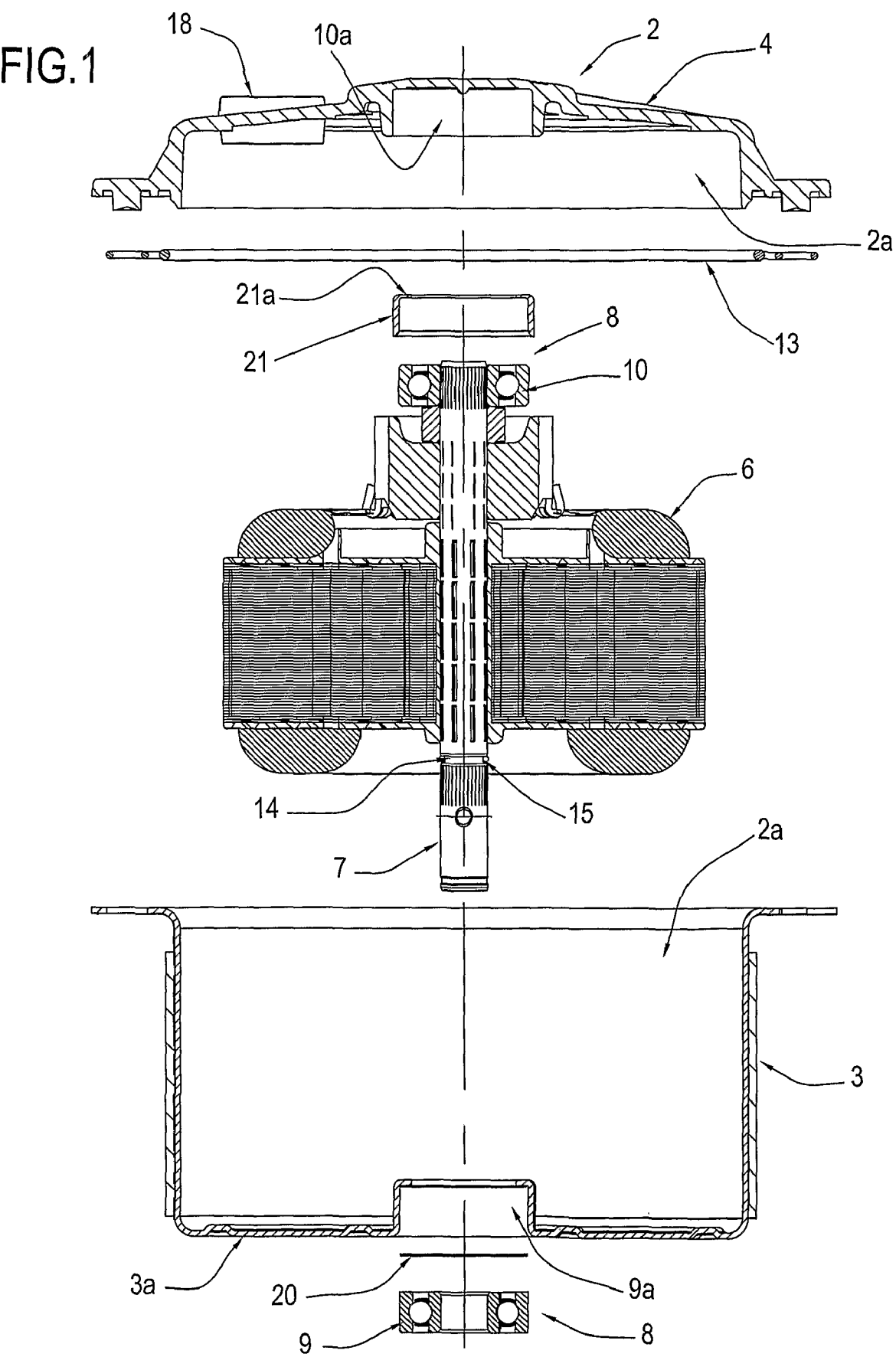
FIG. 1 is an exploded side view, with some parts cut away for greater clarity, of the electric motor in accordance with the present invention, in one step of the assembly method.
Figure 2:
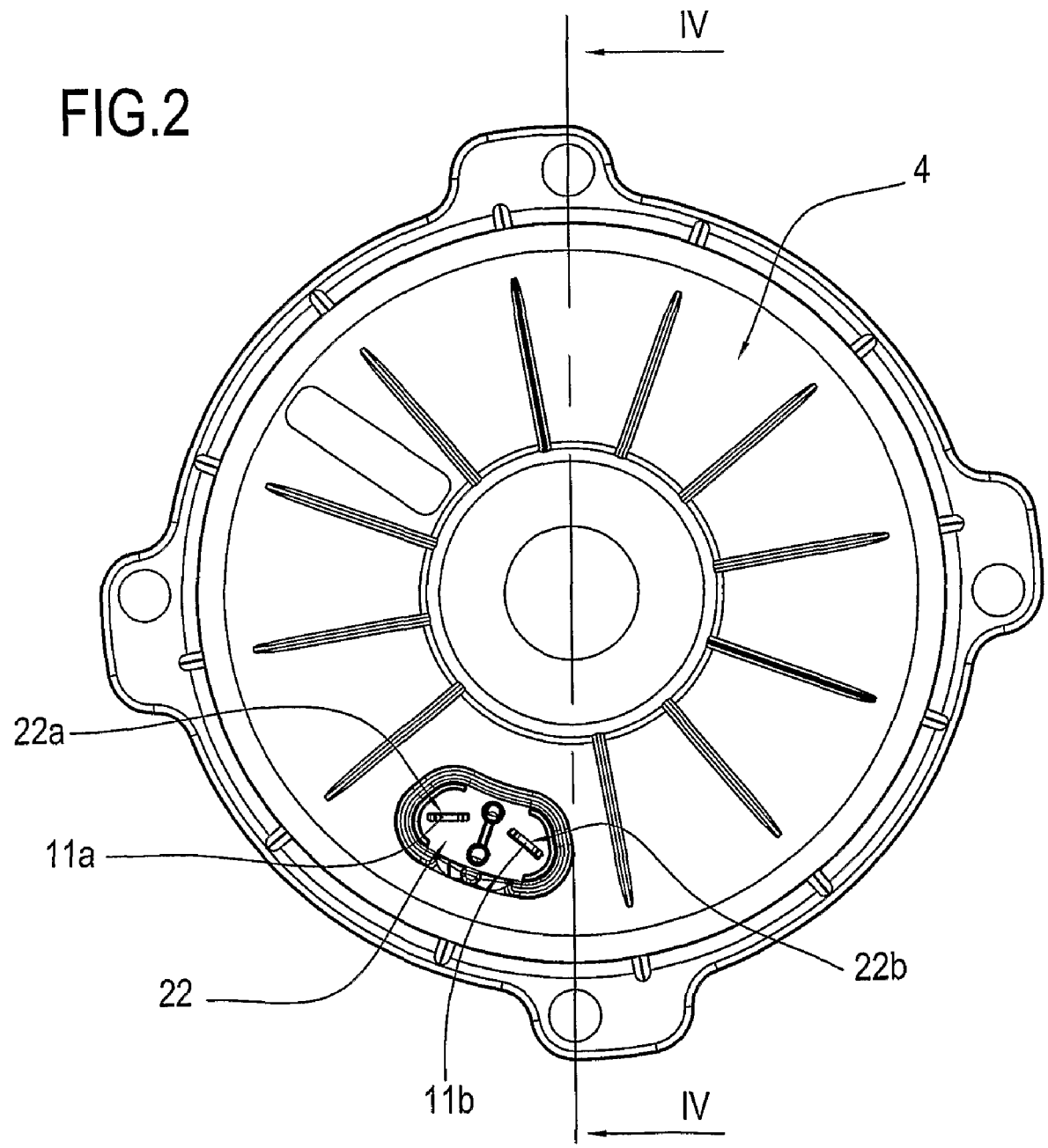
FIG. 2 is a schematic top plan view of the motor in accordance with the present invention, in an assembly step.

It should be noticed that in the exploded diagram in FIG. 1 the brush holder 12 is omitted in order to keep the diagram simple.

Figure 10:
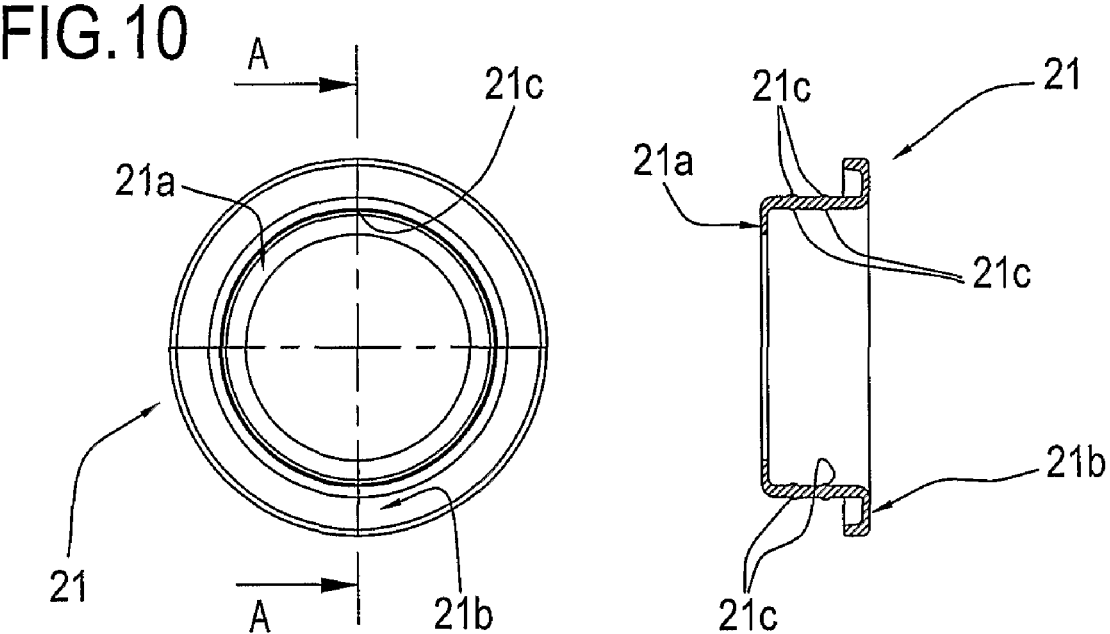
FIG. 10 is a schematic cross-section and a front view of a detail of a fourth embodiment of a motor in accordance with the present invention.
Figure 11:
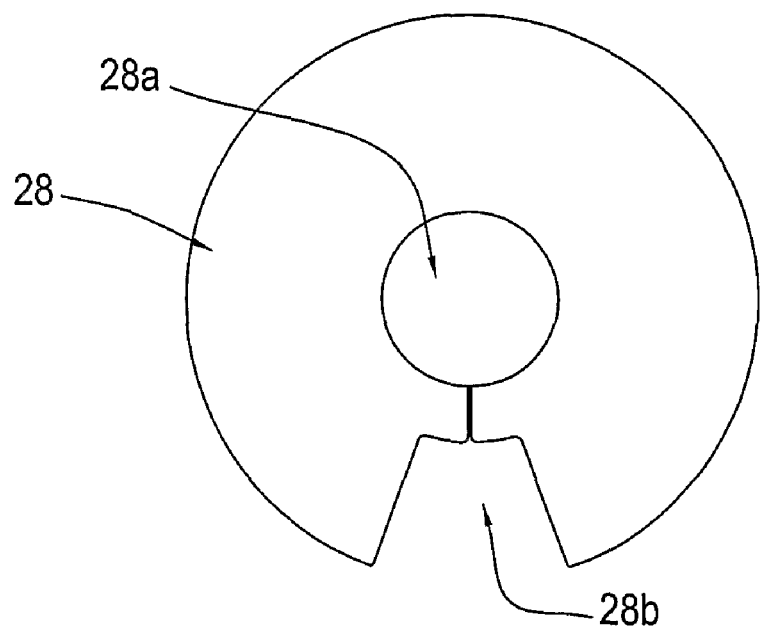
FIG. 11 is a scaled down view compared with the detail from FIG. 10, of a detail of the fourth embodiment of the motor in accordance with the present invention.
Figure 12:
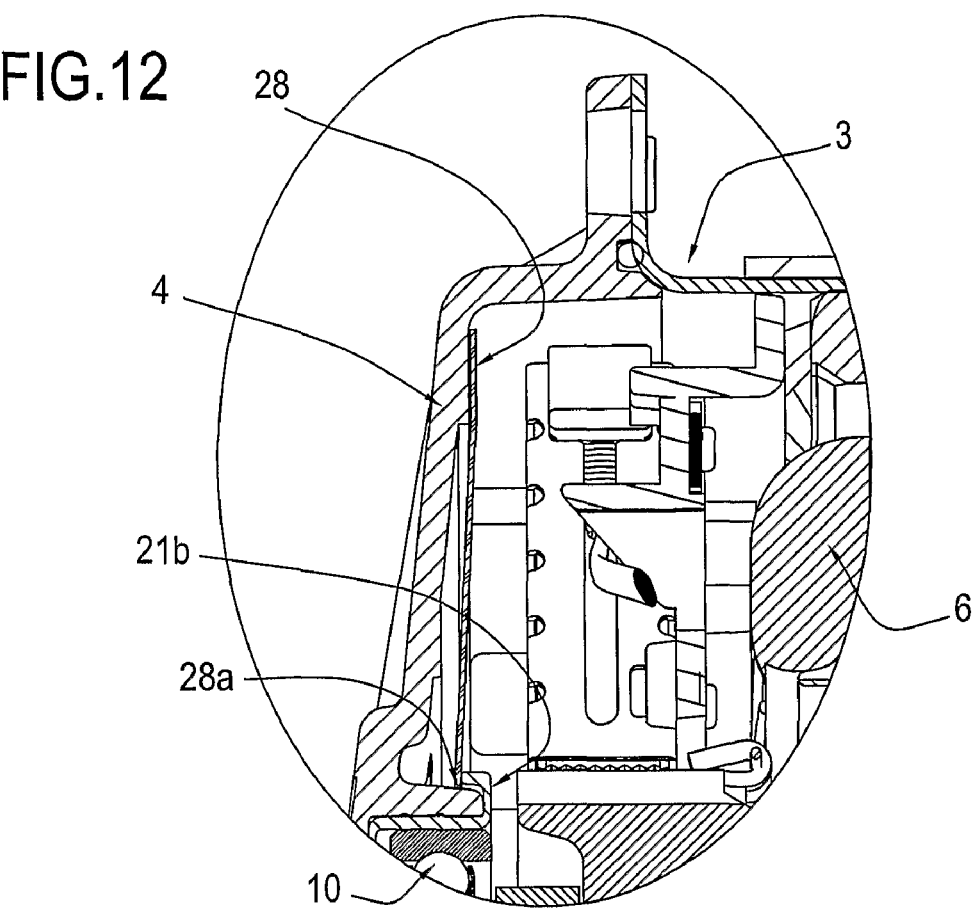
FIG. 12 is a schematic cross-section of a portion of the fourth embodiment of the motor in accordance with the present invention.

In particular with reference to FIGS. 10, 11 and 12, the motor 1 comprises a substantially disk-shaped isolating element 28 positioned in such a way as to protect the lid 4 to prevent accidental short-circuits between the power supply means 11 and the casing 2.

In particular, the isolating element 28 is required if the power supply means 11 comprise brushes, not illustrated in detail, supplied by means of a respective metal braid, also not illustrated, which may accidentally make contact with the lid 4.

The isolating element 28 has a central hole 28a surrounding the cavity 10a of the bearing 10 and an opening 28b for supplying power to the power supply means 11 as described in more detail below.

It should be noticed that the gasket 21 preferably has an outer lip 21b for holding the isolating element 28 in the correct position relative to the lid 4, in particular when the lid 4 is assembled on the cup-shaped part 3.

Advantageously, the gasket 21 has a pair of annular thickened portions 21c for obtaining a seal between the bearing 10 and the relative cavity 10a.

To guarantee the motor 1 an effective seal against external agents, the motor has a gasket 13 positioned between the lid 4 and the cup-shaped part 3.

With reference to FIGS. 1, 4 and 8, the gasket 13 is preferably of the type illustrated in the above-mentioned document WO2005/034309 which is incorporated herein by reference as a non-limiting example and for completeness of description.

Alternatively, the gasket 13 is directly moulded on the lid 4 to simplify motor 1 assembly, that is to say, the lid 4 is made during a first moulding step, and the gasket 13 is provided on the lid 4 during a second moulding step.

Figure 9:
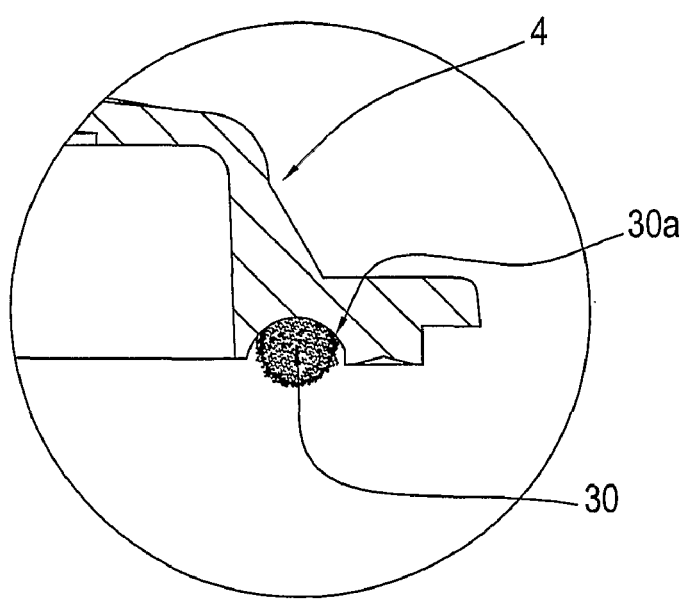
FIG. 9 is a schematic cross-section of a detail of a third embodiment of a motor in accordance with the present invention.

As illustrated in FIG. 9, in a different embodiment, a sealing material 30 is positioned between the lid 4 and the cup-shaped part 3 to form a seal between them.

In the embodiment illustrated, the sealing material 30 is positioned on the lid 4 whilst, in alternative embodiments not illustrated, the material 30 is positioned on the edge of the container 3.

The lid 4 preferably has an annular groove 30a suitably shaped to receive the sealing material 30.

In a preferred embodiment, the sealing material 30 comprises an adhesive.

Advantageously, in another embodiment, the sealing material 30 comprises a polyurethane material.

In that case, a polyurethane foam is dosed in the annular groove 30a. The foam polymerises, substantially resulting in the formation of a gasket having a waterproof outer surface which encloses a foamy core with damping function particularly advantageous for taking up lid 4 closing play and tolerances.

Figure 5:
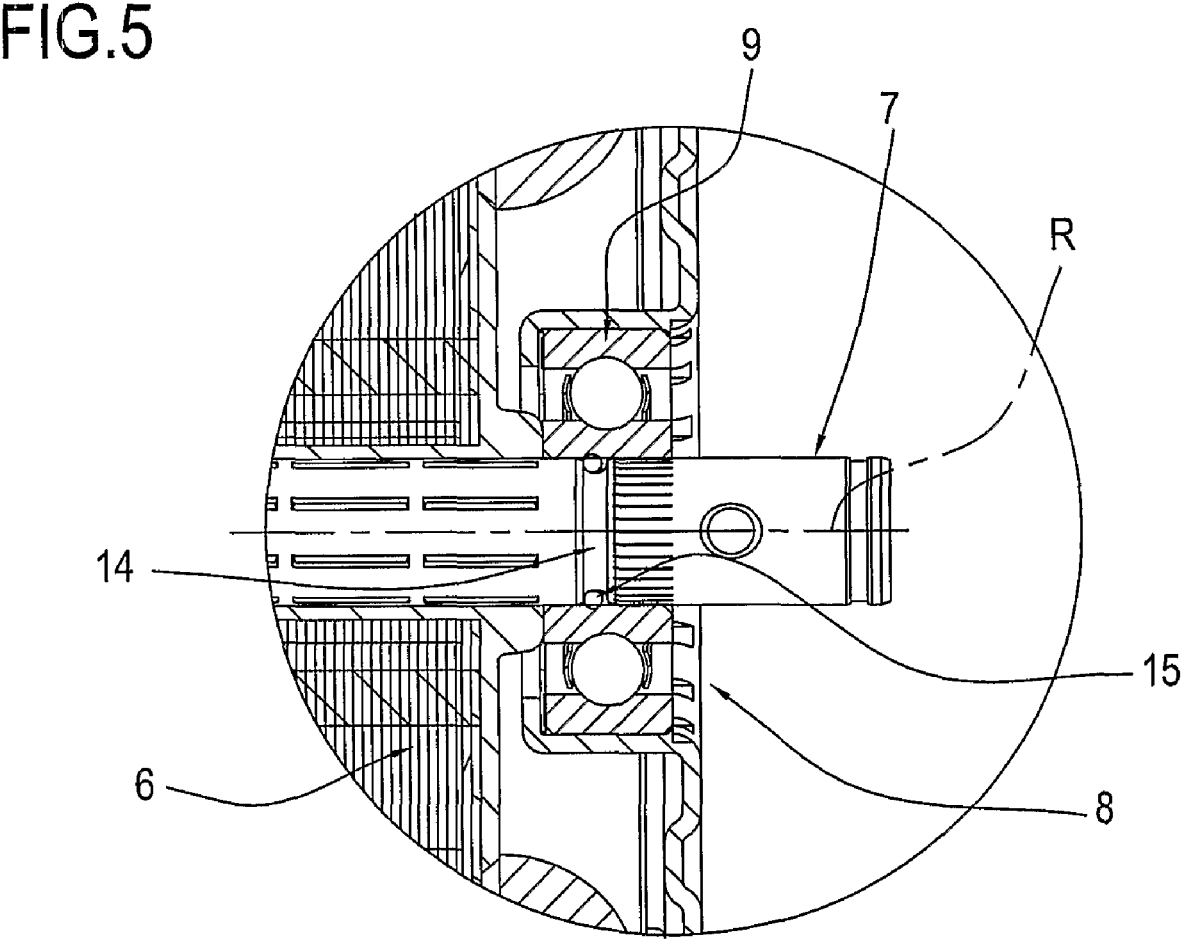
FIG. 5 is an enlarged view of the detail A from FIG. 4.

FIG. 5 in particular shows how the shaft 7 has a substantially annular cavity 14, for an annular gasket 15 between the shaft 7 and the bearing 9.

As illustrated in FIG. 8, the shaft 7 has a second annular cavity 16 for a relative substantially annular gasket 17.

Figure 3:
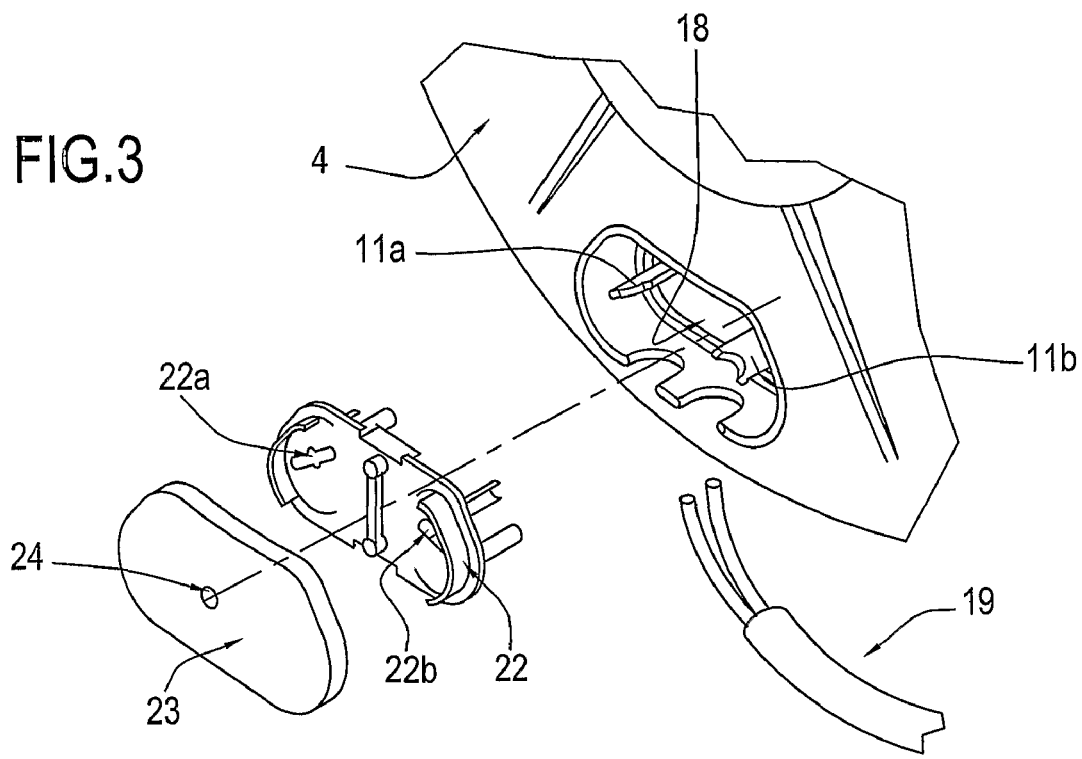
FIG. 3 is a schematic perspective view of a succession of steps of assembling a part of the electric motor in accordance with the present invention.

As illustrated in FIG. 3, the lid 4 has an opening 18 for connection of the power supply means 11 to an external cable 19.

The motor 1 preferably comprises an interconnecting element 22 inserted in the opening 18 where the power supply means 11 are associated with the cable 19.

In particular the power supply means 11 comprise a pair of pins 11a, 11b which are positioned in the opening 18 when the lid 4 is positioned on the cup-shaped part 3.

The interconnecting element 22 has a pair of openings 22a, 22b through which the pins 11a, 11b come out of the lid 4.

The cable 19 is associated with the pins 11a and 11b, preferably by soldering.

A closing element 23 is inserted in the opening 18 to seal the opening 18, as described in more detail below.

The element 23 has a hole 24 for injecting a sealing material into the opening 18.

It should be noticed that the opening 18 and the closing element 23 are shaped in such a way as to allow the cable 19 to pass to the outside of the casing 2.

The method for assembling the motor 1 comprises the steps of inserting the stator unit 5 in the cup-shaped part 3 and locking it to the latter in a relatively known way.

The rotary unit 6 supporting means 8, in particular the bearing 9, are locked in the base wall 3a of the cup-shaped part 3.

The bearing 9 is inserted in the cavity 9a together with the O-ring 20 and locked in positioned by caulking the cavity 9a.

The rotary unit 6 is then inserted in the cup-shaped part 3 substantially at the stator unit 5.

In particular, the shaft 7 is inserted through the bearing 9 and constrained to it.

It should be noticed that the gasket 15, preferably of the "O-ring" type, being pressed in the cavity 14 between the shaft 7 and the bearing 9, guarantees a motor 1 seal against external agents where the shaft 7 comes out of the casing 2.

As illustrated in FIG. 8, in a substantially similar way, in the case of a twin-shaft motor 1, the gasket 17 pressed in the cavity 16 between the shaft 7 and the bearing 10 guarantees a seal against external agents at said bearing 10.

The brush holder 12 is inserted in the cup-shaped part 3 and the lid 4 is positioned in such a way that it closes the part 3.

It should be noticed that during this step the lid 4 is not locked to the cup-shaped part 3, but is placed in the position it has on the finished motor 1 and held there.

It should be noticed that if the isolating element 28 is required, it is held in the correct position by the gasket 21 outer lip 21b.

Preferably, with the motor 1 in this configuration, several electric tests are carried out in the substantially known way.

In particular, the motor rpm, noise and amperage draw are tested.

As illustrated in FIG. 6, with the lid 4 positioned on the cup-shaped part 3 and the casing 2 substantially closed, the motor 1 hermetic seal is tested.

The motor hermetic seal is preferably tested at the end of the electric tests.

The motor 1 hermetic seal is preferably tested by exposing the casing 2 and therefore also the compartment 2a to a different pressure relative to the outside environment.

In particular, the motor 1 hermetic seal is tested by detecting any passage of a fluid between the outside environment and the compartment 2a after application of said difference in pressure.

In the preferred embodiment illustrated the step of exposing the compartment 2a to a different pressure is carried out by blowing a gas into the casing 2 to bring the pressure in the compartment 2a to values higher than the outside environment, that is to say, exposing the compartment 2a to an overpressure relative to the outside environment.

In particular, pneumatic means 25, of a substantially known type, are put in fluid communication with the inside of the casing 2.

In more detail, a hood 26 rests on the lid 4 in a hermetic way and the pneumatic means 25 engage the opening 18 in a sealed way.

The pneumatic means 25 blow a gas into the casing 2 and if no gas leaks out of the casing 2 then the motor 1 is definitely sealed.

Preferably, during the action of the pneumatic means 25 the interconnecting element 22 is inserted in the opening 18.

Advantageously, the motor 1 hermetic seal can be tested by means of a sucking action from the inside of the casing 2 towards the outside. The pneumatic means 25 put in fluid communication with the compartment 2a substantially suck air out of the compartment 2a until a vacuum is created in it, that is to say, the compartment 2a is subjected to a lower pressure than the outside environment.

If, as the sucking action is continued, air passes from the outside environment into the casing 2, this shows that the motor is not hermetically sealed.

It should be noticed that the step of testing the motor 1 hermetic seal and the electric tests may be carried out in the same test station.

If the tests are carried out manually by an operator, they are preferably carried out in the same station, for example the station 27 illustrated in FIG. 6.

Advantageously, when the motor 1 is assembled in a production line, not illustrated, the electric and hermetic seal tests are carried out in two separate stations.

When the tests are complete, the casing 2 is closed, that is to say, the lid 4 and the cup-shaped part 3 are locked relative to one another in the substantially known way.

The cable 19 is soldered to the power supply means 11 at the connecting element 22.

Once the lid 4 has been locked on the cup-shaped part 3 and the cable 19 has been connected to the power supply means 11, the opening 18 is sealed.

The closing element 23 is inserted in the opening 18 and driven into it.

As schematically illustrated in FIG. 7, the sealing material, preferably adhesive, is then injected, in a substantially known way, into the opening 18 through the hole 24 in the closing element 23.

It should be noticed that the connecting element 22 functions as an element for collecting the sealing material and the opening 18 is completely sealed.

Another motor 1 hermetic seal test is preferably advantageously feasible once the motor has been assembled, in particular if using the brush holder lid 4a.

In this case, the lid 4a, with the sealing material 30 on it, preferably adhesive, is used to close the container 3.

The motor 1 is immersed in a test liquid to check if any of the liquid enters the compartment 2a.

The motor 1 seal is preferably tested after thermal transients.

The motor 1 is heated then immersed in the test liquid.

Preferably, once it has cooled, the motor 1 is heated again then immersed in the fluid, which must not penetrate the motor 1 after the thermal expansions due to the sudden changes in temperature.

This procedure may be repeated several times as necessary.

It should be noticed that the hermetic seal test involving immersion in the test fluid is feasible with any type of motor 1.

Figure 13:
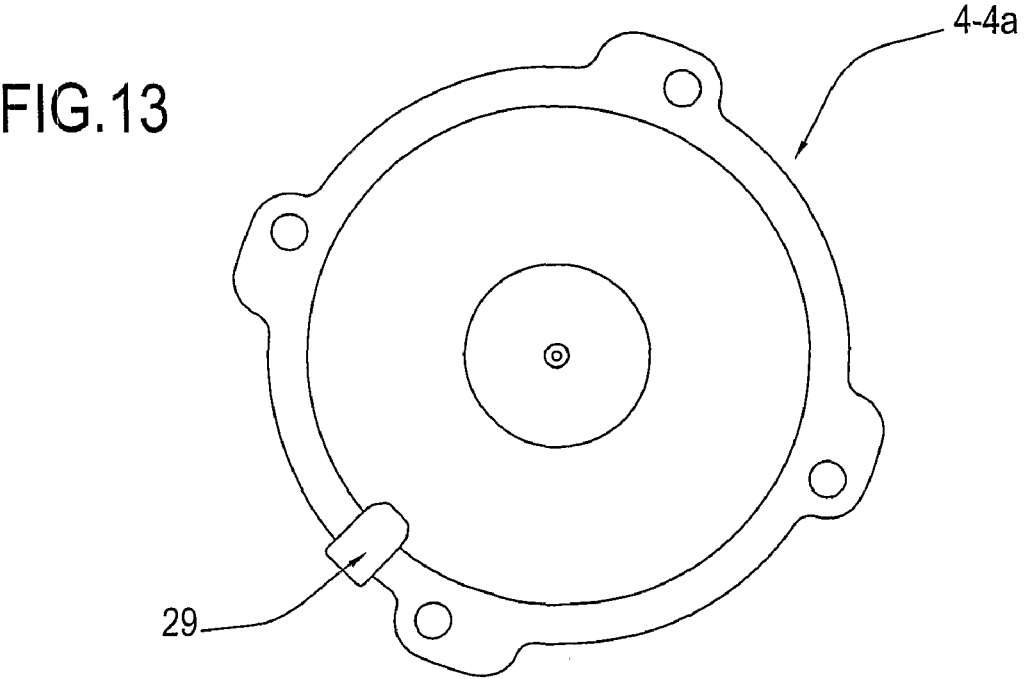
FIG. 13 is a schematic front view of a lid of a fifth embodiment of a motor in accordance with the present invention.
Figure 14:
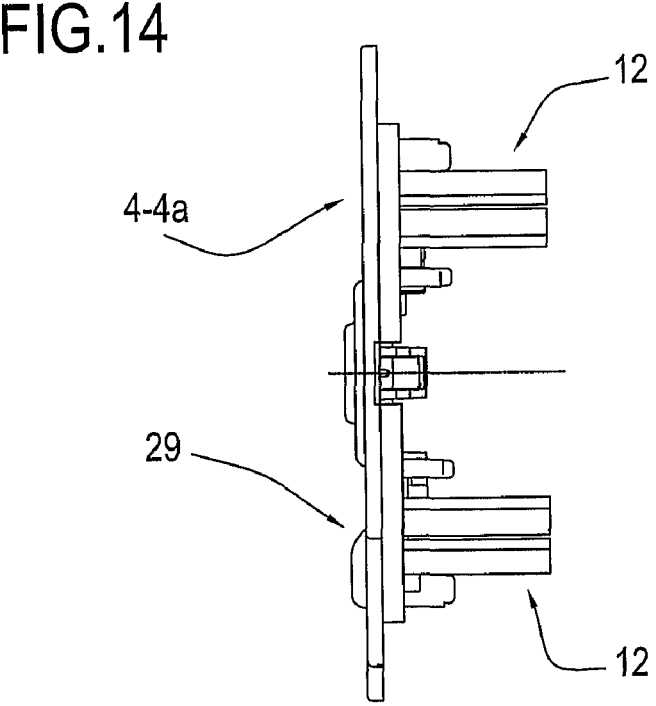
FIG. 14 is a schematic side view of the lid of FIG. 13.
Figure 15:
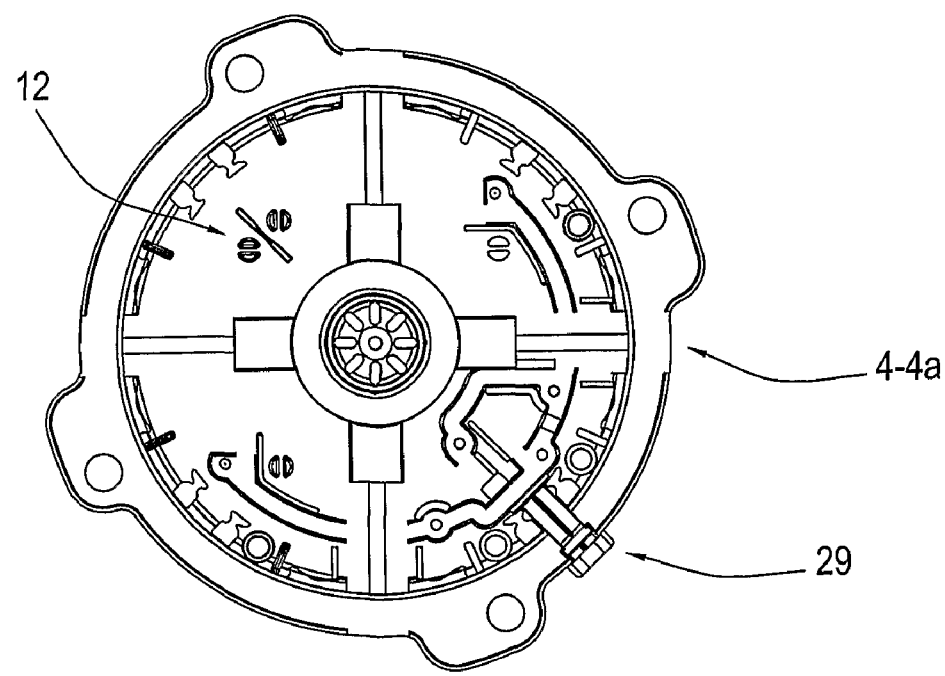
FIG. 15 is a schematic rear view of the lid of FIG. 13.

In particular with reference to FIGS. 13, 14 and 15, it should be noticed that the hermetic seal test involving immersion in the test fluid may advantageously be carried out on motors 1 comprising the moulded lid 4 also functioning as the brush holder 12 support. Hereinafter, for the sake of simplicity, said lid 4, moulded and comprising the brush holder 12, will be referred to simply as the brush holder lid 4a.

Such motors do not have openings giving access to the compartment 2a, since the brush holder lid 4a substantially houses a pin 29 for connecting the lid 4a to the external cable 19 in a substantially known way.

It should be noticed that in such motors the seal between the brush holder lid 4a and the container 3 is preferably obtained using the sealing material 30.

The sealing material 30 used with the brush holder lid 4a preferably comprises an adhesive.

In another embodiment, the sealing material 30 comprises a silicone material or a polyurethane material.

The sealing material 30 is preferably placed directly on the lid 4a when lid moulding is completed.

Advantageously, in an alternative embodiment, not illustrated, the brush holder lid 4a is closed on the cup-shaped part 3 by inserting a relative gasket, as well as the sealing material, between them.

Advantageously, said gasket is moulded on the brush holder lid 4a, that is to say, the brush holder lid 4a is obtained in a first moulding step and the gasket is provided on it in a second moulding step.

The invention brings important advantages.

Thanks in particular to the hermetic seal test carried out with pneumatic means, the motor seal, created as a-result of the gaskets present on the shaft, the gasket between the lid and the cup-shaped part and the special bearings used, is effectively tested.

Said step is easy to carry out and so relatively inexpensive.

Further seal guarantees are supported by the tests which may be carried out on the motor after thermal transients.

The invention described above may be modified and adapted in several ways without thereby departing from the scope of the inventive concept, as defined in the claims herein.

Moreover, all the details of the invention may be substituted by technically equivalent elements.

What is claimed is:

1. An electric motor comprising:
    an outer casing formed by a cup-shaped container and by at least one lid;
    a stator unit and a rotary unit housed in the casing, the rotary unit comprising a shaft projecting from the casing;
    a bearing disposed between the shaft and the outside of the casing to rotatably constrain the shaft within the casing;
    a power supply inserted in the casing;
    a seal positioned between the lid and the cup-shaped container, the motor being characterized in that the shaft has at least one annular cavity that houses an annular gasket between the shaft and the bearing, the casing having an external cavity that receives the bearing, the annular gasket being positioned between the shaft and the bearing forming a hermetic seal between the shaft's projection and the casing.

2. The motor according to claim 1, wherein the seal is a gasket.

3. The motor according to claim 1, characterized in that the seal is an elastomeric or silicone material, the lid in particular being made by moulding in a single body with part of the power supply to form a brush holder lid made of a plastic material.

* * * * *